United States Patent Office 3,490,935
Patented Jan. 20, 1970

3,490,935
ARTICLE COATED WITH FLUORESCENT
ADHESIVE AND FLOCK
Victor Danberg, 6 Mary Ann Lane,
Wallingford, Conn. 06492
No Drawing. Filed Sept. 6, 1966, Ser. No. 577,135
Int. Cl. B44c 1/06; B44d 5/00
U.S. Cl. 117—33                                    5 Claims

ABSTRACT OF THE DISCLOSURE

An article coated with an adhesive composition containing a fluorescent colorant and a non-fluorescent flock layer which protects the colorant is disclosed. The appearance of the flock coating may be modified by reflectants such as small glass or plastic beads, granules or flakes.

---

This invention relates to fluorescent coatings having an extended fluorescent lifetime and the process of applying such coatings.

Fluorescent dyes and pigments are of value in coatings because of the extreme brightness and the glowing characteristics which make them of value both for attracting attention in warning signals, signs, etc., and for their decorative characteristics. However, on continued exposure to light, the fluorescent characteristic gradually diminishes. Effective fluorescence is lost after about six months. Fluorescent dyed flock containing a colorless (white) or colored fluorescent dye lasts for less than six months. Paints or adhesive compositions containing fluorescent colorants, such as dyes or pigments, give coatings which retain their effective fluorescence for only about six months. Accordingly, (1) fluorescent flock coatings when applied to a given surface by means of an adhesive composition and (2) paint or adhesive coatings containing a fluorescent colorant when employed alone are unsatisfactory for practical purposes because of their short tended effective lifetime.

Applicant has now discovered that application of colorless flock, dyed flock, or flock containing a white (colorless) fluorescent material to an adhesive coating composition containing a fluorescent colorant give a coating that has an effective fluorescent lifetime of at least two years. The synergistic effect of this combination was entirely unexpected. In addition, fluorescent dye coatings obtained in this way do not have the harshness or irritating character of the ordinary dyed coatings and produce a pleasant matte velour surface with a carpet-like finish.

Accordingly, an object of this invention is to provide a new and improved fluorescent coating having an extended effective lifetime.

Another object of this invention is to provide a new and improved method for the application of the said fluorescent coatings.

Still other objects and advantages of this invention will in part be obvious and will in part appear from the specification.

The invention is carried out by applying an adhesive preparation containing a fluorescent colorant, pigment or dye to the surface to be coated, with a brush or spray gun, followed by the application of a flock agent comprising, preferably a finely-divided synthetic fiber. The latter is most readily applied by means of a blower or other applicator.

For the purposes of this invention, the term "flock agent" is defined as finely-divided fibers or other finely-divided materials which are insoluble in water, colorless or light-colored, and capable of adhereing to an adhesive, preferably a water-based adhesive. Agents falling within this category include cellulosic agents such as wood pulp, wood flour, cotton, cellulose acetate; vegetable fibers such as jute, ramie, linen and sisal fibers; animal hairs such as wool, rabbit hair, hog bristles; chopped feathers; synthetic fibers such as acrylics, polyvinylidenes, polyesters, acetals, etc.

The preferred flock agents consist of colorless or light colored finely-divided synthetic fibers or mixtures thereof comprising rayon, nylon, polyacrylics, polyesters, glass, etc. However glass fibers are sometimes impracticable because of handling hazards. Natural fibers such as cotton, ramie, sisal, etc., and materials such as wood flour may be used but are less satisfactory than the synthetic fibers because of their optical properties. These materials are of poor transparency and reduce the effective color and fluorescent intensity of the finished coating.

Suitable fluorescent colorants for use may comprise any of the well known fluorescent dyes or pigments. Particularly suitable are the Switzer "Day-Glo" daylight fluorescent pigments in which a fluorescent dye is incorporated with an organic glass-like material, as described in U.S. Patents 2,809,954, Oct. 15, 1967 and 2938,873, May 31, 1960.

Suitable adhesives comprise commercial adhesive preparations of polyvinyl acetate, polyvinyl alcohol, acrylic adhesives, etc. Preferred specific adhesives are: "Flexbond" polyvinyl acetate (Air Reduction & Chemical Co.), "Vinol" polyvinyl alcohol (Air Reduction & Chemical Co.), "Rhoplex" copolymers acrylic adhesive (Rohm & Hass), "Metax" 996–JC1 (Adhesive products Corp.). All of the aforesaid are water-based adhesive compositions and are cited as being suitable for use. It should be noted, however, that many other water-based or solvent-based preparations may be employed. These may include aminoplast resins, phenoplast resins and animal glue. The preferred adhesive compositions are non-solvents for fluorescent pigments.

With regard to the flock agent employed in the coatings and process, it should be noted that either white or colored flock may be used and may contain either a white (colorless) or a colored fluorescent dye. Mixtures of said white and/or colored flock may also be used, depending upon the color requirements of the coating.

Particularly suitable for the application of either the fluorescent adhesive composition or the flock itself, is applicant's material-applying apparatus (U.S. Patent 3,201,047, Aug. 17, 1966).

The appearance of the flock coating may be modified by the inclusion of reflectants, such as small glass or plastic beads, granules, flakes, etc. Any surface capable of accepting an adhesive may be coated. A dark surface, however, may require more than one coating of the adhesive-pigment composition. The following example is given for the purposes of illustrating the practice of the invention:

An adhesive composition was prepared, consisting of 80 parts of a commercial 55% polyvinyl acetate latex, 20 parts of a 5% water solution of polyvinyl alcohol and 10–30 parts of Arc Yellow A16 Switzer daylight fluorescent pigment. This mixture was air-sprayed on a light-colored surface to produce a coating having a thickness of at least 5 mils. The coating was allowed to dry to a tacky surface, then given a second coat of adhesive composition and was then coated with a rayon flock by airspraying. The resultant flock-adhesive coating retained its fluorescence and brightness for over 2.7 years' outdoor exposure, whereas normal fluorescent life of the fluorescent pigment used is approximately six months.

It should be noted that the above example is given solely for the purposes of illustration and that many variations within the scope of this invention will be obvious to one having ordinary skill in the art. For example, small amounts of plasticizers, thickeners, antioxidants or other agents may be incorporated in the adhesive composition as required to improve applicability and other desired characteristics.

Although various embodiments of the invention have been described, it is not intended to limit the invention thereto, but to include all of the obvious variations and modifications.

What is claimed is:

1. An article comprising a structure having thereon a fluorescent flock coating comprising a first adhesive coating containing a finely-divided fluorescent pigment therein and a second coating of a flock agent consisting of non-fluorescent finely-divided fibers on said first coating, such that the first coating is clearly visible and whereupon the second coating protects and enhances the fluorescent effect of the first coating.

2. An article in accordance with claim 1, wherein said first adhesive coating contains an adhesive composition selected from the group consisting of polyvinyl acetate, polyvinyl alcohol and acrylic copolymer adhesives.

3. An article in accordance with claim 1, wherein said flock agent is white or colorless non-fluorescent finely-divided synthetic fibers.

4. An article in accordance with claim 1, wherein there is further present on said first adhesive coating a reflectant of small glass beads, plastic beads, glass flakes or plastic flakes.

5. An article in accordance with claim 1, wherein the fluorescent pigment is a daylight fluorescent pigment.

References Cited

UNITED STATES PATENTS

| | | | |
|---|---|---|---|
| 2,534,113 | 12/1950 | Egger | 117—33 |
| 2,964,421 | 12/1960 | Rockoff | 117—33 |
| 3,049,436 | 8/1962 | Stewart et al | 117—33 X |
| 3,253,146 | 5/1966 | De Vries | 117—33.5 X |

FOREIGN PATENTS 713,073   8/1954   Great Britain.

OTHER REFERENCES

Phillips, A. L., Flock Finishing, Part II November 1952, pp. 12–16; Organic Finishing.

WILLIAM D. MARTIN, Primary Examiner

117—25, 33.5